US009726437B2

(12) United States Patent
Laurberg et al.

(10) Patent No.: US 9,726,437 B2
(45) Date of Patent: Aug. 8, 2017

(54) STORAGE AND RECOVERY OF THERMAL ENERGY USING HEAT STORAGE MATERIAL BEING FILLED IN A PLURALITY OF ENCLOSURES (75) Inventors: Hans Laurberg, Århus C (DK); Henrik Stiesdal, Odense C (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 565 days.

(21) Appl. No.: 14/352,288

(22) PCT Filed: Sep. 4, 2012

(86) PCT No.: PCT/EP2012/067202
§ 371 (c)(1),
(2), (4) Date: Apr. 16, 2014

(87) PCT Pub. No.: WO2013/064286
PCT Pub. Date: May 10, 2013

(65) Prior Publication Data
US 2014/0284021 A1  Sep. 25, 2014

(30) Foreign Application Priority Data
Nov. 4, 2011  (EP) .................................. 11187903

(51) Int. Cl.
F28D 17/00 (2006.01)
F28D 20/00 (2006.01)
F01K 3/12 (2006.01)
(52) U.S. Cl.
CPC ............ *F28D 20/0056* (2013.01); *F01K 3/12* (2013.01); *F28D 2020/0078* (2013.01); *Y02E 60/142* (2013.01)

(58) Field of Classification Search
CPC ......... F28D 20/0056; F28D 2020/0078; F28D 2020/0004; F28D 2020/0013; F01K 3/12; Y02E 60/142
(Continued)

(56) References Cited

U.S. PATENT DOCUMENTS 6,343,485 B1 * 2/2002 Duerr ..................... B60H 1/005
62/430
9,518,786 B2 * 12/2016 Howes ..................... F01K 3/12
(Continued)

FOREIGN PATENT DOCUMENTS

CN 101828319 A 9/2010
CN 101883913 A 11/2010
(Continued)

*Primary Examiner* — Len Tran
*Assistant Examiner* — Claire Rojohn, III
(74) *Attorney, Agent, or Firm* — Beusse Wolter Sanks & Maire (57) ABSTRACT A thermal energy storage and recovery device is provided including a container having a first fluid terminal for inserting heat transfer medium into the interior of the container and a second fluid terminal for extracting heat transfer medium from the interior of the container, a heat storage material for receiving thermal energy from the heat transfer medium when in a first operational mode and releasing thermal energy to the heat transfer medium when in a second operational mode, and a plurality of enclosures each filled at least partially with a part of the heat storage material. The enclosures are spatially arranged within the container so a flow of the heat transfer medium is guidable between the first and second fluid terminals and a direct thermal contact between the heat transfer medium and the enclosures is achievable as the heat transfer medium flows between the first and second fluid terminals.

13 Claims, 2 Drawing Sheets (58) Field of Classification Search
USPC .................................... 165/10, 45, 48.1, 61
See application file for complete search history.

(56) References Cited

U.S. PATENT DOCUMENTS

| | | | |
|---|---|---|---|
| 2004/0194932 A1* | 10/2004 | Jensen | F28D 7/1669 165/135 |
| 2008/0016866 A1* | 1/2008 | Mohr | F28D 20/0056 60/649 |
| 2010/0218500 A1 | 9/2010 | Ruer | |
| 2010/0251711 A1* | 10/2010 | Howes | F01K 3/06 60/659 |
| 2010/0301614 A1* | 12/2010 | Ruer | F01K 3/12 290/1 A |
| 2011/0108020 A1 | 5/2011 | McEnerney | |
| 2011/0286724 A1* | 11/2011 | Goodman | F28D 19/04 392/346 |

FOREIGN PATENT DOCUMENTS

| | | | | |
|---|---|---|---|---|
| DE | EP 2933594 A1 * | 10/2015 | ............ | F28D 20/00 |
| EP | 2350549 A1 | 8/2011 | | |
| FR | 2922608 A1 | 4/2009 | | |
| JP | 2012189245 A | 10/2012 | | |
| WO | 2008148962 A2 | 12/2008 | | |
| WO | 2009044139 A2 | 4/2009 | | |
| WO | 2010060524 A1 | 6/2010 | | |

* cited by examiner

STORAGE AND RECOVERY OF THERMAL ENERGY USING HEAT STORAGE MATERIAL BEING FILLED IN A PLURALITY OF ENCLOSURES

CROSS REFERENCE TO RELATED APPLICATIONS

This application is the US National Stage of International Application No. PCT/EP2012/067202 filed, Sep. 4, 2012 and claims the benefit thereof. The International Application claims the benefit of European Application No. EP11187903 filed Nov. 4, 2011. All of the applications are incorporated by reference herein in their entirety.

FIELD OF INVENTION

The present invention relates to the field of temporarily storing and recovering thermal energy. In particular, the present invention relates (a) to a thermal energy storage and recovery device comprising a heat storage material which can be thermodynamically coupled to a heat transfer fluid. Further, the present invention relates (b) to a thermal energy storage and recovery system being equipped with such a thermal energy storage and recovery device. Furthermore, the present invention relates (c) to a method for storing thermal energy within such a thermal energy storage and recovery device and (d) to a method for recovering thermal energy from such a thermal energy storage and recovery device.

ART BACKGROUND

The production of electric power from various types of alternative energy sources such as for instance wind turbines, solar power plants and wave energy plants is not continuous. The production may be dependent on environmental parameters such as for instance wind speed (for wind turbines), sunshine intensity (for solar power plant) and wave height and direction (for wave energy plants). There is very often little or no correlation between energy production and energy demand.

One known approach to solve the problem of uncorrelated electric power production and electric power demand is to temporarily store energy, which has been produced but which has not been demanded, and to release the stored energy at times at which there is a high demand. In the past there have been suggested many different methods to temporarily store energy. Suggested methods are for instance (a) mechanical energy storage methods e.g. pumped hydro storage, compressed air storage and flywheels, (b) chemical energy storage methods e.g. electrochemical batteries and organic molecular storage, (c) magnetic energy storage, and (d) thermal energy storage.

The document US 2010/0301614 A1 discloses an installation for storing and returning electrical energy. The disclosed installation comprises a first enclosure and a second enclosure each containing a gas and porous refractory materials suitable for transferring heat by contact between said porous refractory materials and a gas flowing through the respective enclosure. The disclosed installation further comprises a compressor and an expander for the gas flowing in pipes between each of the ends of an enclosure connected to an end of the other enclosure. The porous refractory materials may be formed as bricks such as fire clay or a similar material.

The document WO 2009/044139 A2 discloses an apparatus for storing energy. The disclosed apparatus comprises (a) a compression chamber means for receiving a gas; (b) a compression piston means for compressing gas contained in the compression chamber means; (c) a first heat storage means for receiving and storing thermal energy from gas compressed by the compression piston means; (d) an expansion chamber means for receiving gas after exposure to the first heat storage means; (e) an expansion piston means for expanding gas received in the expansion chamber means; and (f) a second heat storage means for transferring thermal energy to the gas expanded by the expansion piston means. The cycle used by the apparatus has two different stages that can be split into separate devices or can be combined into one device. The first heat storage means and the second heat storage means may be equipped with gravel or rocks representing a heat storage material.

However, at many locations where alternative energy sources are erected and where the energy production does not correspond to the energy demand gravel or rocks are not available in big amounts. Often, e.g. in Denmark, the landscape is characterized by sediments and deposits like sand from a number of ice ages. The sedimentary rocks like flint stone being available in such regions are not suited for heating and repeating thermal cycles because of the risk of stone fracturing. The preferred rocks for high temperature storage is called igneous rocks like granite but this type of rock is not available everywhere and needs to be transported which is costly.

There may be a need for providing a thermal energy storage and recovery device being suitable for using a widely available and cheap material as a heat storage material.

SUMMARY OF THE INVENTION

This need may be met by the subject matter according to the independent claims. Advantageous embodiments of the present invention are described by the dependent claims.

According to a first aspect of the invention there is provided a thermal energy storage and recovery device comprising (a) a container having a first fluid terminal for inserting a heat transfer medium into the interior of the container and a second fluid terminal for extracting the heat transfer medium from the interior of the container, (b) a heat storage material (b1) for receiving thermal energy from the heat transfer medium when the thermal energy storage and recovery device is in a first operational mode and (b2) for releasing thermal energy to the heat transfer medium when the thermal energy storage and recovery device is in a second operational mode, and (c) a plurality of enclosures each being filled at least partially with a part of the heat storage material, wherein the enclosures are spatially arranged within the container in such a manner that (i) a flow of the heat transfer medium is guidable between the first fluid terminal and the second fluid terminal and (ii) a direct thermal contact between the heat transfer medium and the plurality of the enclosures is achievable as the heat transfer medium flows between the first fluid terminal and the second fluid terminal.

The described thermal energy storage and recovery device is based on the idea that by spatially arranging a heat storage material within a container a heat transfer medium can be guided through the container without requiring special heat exchanger means such as metal pipes running through the container and providing a thermal interaction between the heat storage medium and the special heat exchanger means.

By avoiding the use of a heat exchanger means being spatially distributed within the container it can be ensured that there is a good thermal contact between the heat storage medium and the heat transfer medium flowing through the container between the first fluid terminal and the second fluid terminal. Thereby, the efficiency of the thermal energy storage and recovery process can be increased.

The described enclosures may be realized by any suitable physical structure, which is configured for receiving or accommodating the heat storage material. Thereby, the heat storage material may be completely or partially surrounded by the respective enclosure. In this respect it is crucial that during the operational lifetime of the thermal energy storage and recovery device the heat storage material is maintained in the respective enclosures and the enclosures do not lose their heat storage material.

The enclosures make it possible to build up the thermal energy storage and recovery device wherein the empty space between the various enclosures provides a spatially distributed channel within the container for a flow of heat transfer fluid between the first fluid terminal and the second fluid terminal.

The heat transfer medium may be any fluid (i.e. a liquid and/or a gas) which can be guided through the container between the first fluid terminal and the second fluid terminal. Preferably, the heat transfer medium is air.

According to an embodiment of the invention the enclosures are made at least partially from a fiber material, in particular from a glass fiber material and/or from a basalt fiber material. This may provide the advantage that the fiber material provides a cheap and mechanically stable structure in order to keep the heat storage material in place within the container. In particular, enclosures made from fiber material are much cheaper as known enclosures which are made from steel.

According to a further embodiment of the invention the enclosures are tube like structures. Thereby, the tube like structures, which accommodate the heat storage material, may have an outer shape in the form of a cylinder and in particular in the form of an oval or a circular cylinder. The tube like structures may have two open end faces such that the heat storage material can be filled into the interior of the tube like structure from both ends. Alternatively, the tube like structure may have only one open end face such that the heat storage material can be filled into the interior of the tube like structure only through one single open end. In the latter case the three dimensional shape of the tube like structures is similar to a sock.

In case the described tube like structures are made from a fiber material the fiber material may be braided or woven as tubes or socks.

Further, fiber material being formed in a tube or sock like manner may provide the advantage that the heat storage material can also comprise at least partially usual stone material. During the operation of the thermal energy storage and recovery device with a plurality of temperature cycles each including a temperature increase and a temperature decrease stones may erode. However, even if the stones will convert to grained or granular material (e.g. sand) this material will be kept within the enclosures.

It is mentioned that apart from a tube like structure also other patterns or geometries might be possible to realize the enclosures.

According to a further embodiment of the invention within the container the tube like structures are arranged in alternating layers whereby within each layer the tube like structures are oriented parallel with respect to each other and whereby the tube like structures being assigned to neighboring layers are oriented angularly with respect to each other. This may provide the advantage that the enclosures are spatially arranged by means of a very simple geometric structure which makes an assembly of the thermal energy storage and recovery device very simple.

Preferably, tube like structures being assigned to neighboring layers are oriented perpendicular with respect to each other. This may provide the advantage that the three dimensional structure of the spatial arrangement of the enclosures can be even made more simple.

According to a further embodiment of the invention the heat storage material being accommodated within the enclosures is at least partially sand. This may provide the advantage that a cheap and widely available material can be used as the heat storage material such that the whole thermal energy storage and recovery device can be realized in a comparatively cheap manner.

According to a further embodiment of the invention the enclosures are sealed with a sealing material. This may provide the advantage that the heat storage material will be kept in place even if, e.g. after a plurality of extreme temperature cycles, the heat storage material has converted into a fine powder or a dust. The sealing material may be e.g. tar and/or a preferably thin metal foil.

According to a further embodiment of the invention an outer wall of the container is made at least partially from concrete. This may provide the advantage that the container can be realized in a cheap and in a mechanically very stable manner. Thereby, only one, two or more and in particular all outer walls of the container may be made at least partially from concrete.

According to a further embodiment of the invention the outer wall is insulated with an insulation layer comprising an insulation material that is able to withstand temperatures above 550° Celsius.

The insulation layer, which may have a thickness of between 0.5 to 2 meters, may be arranged at the inner side and/or at the outer side of the outer wall. Preferably, the insulation layer is arranged exclusively at the inner side such that the insulation material is protected by the concrete.

According to a further aspect of the invention there is provided a thermal energy storage and recovery system comprising (a) a thermal energy storage and recovery device as described above, (b) a first fluid energy machine being connected with the first fluid terminal, and (c) a second fluid energy machine being connected with the second fluid terminal. Thereby, the first fluid energy machine and the second fluid energy machine are configured such that (i) in a first operational mode in which the thermal energy storage and recovery device is supposed to receive thermal energy the first fluid energy machine generates thermal energy for the thermal energy storage and recovery device and the second fluid energy machine receives thermal energy from the thermal energy storage and recovery device, wherein the generated thermal energy is larger than the received thermal energy. Further, (ii) in a second operational mode in which the thermal energy storage and recovery device is supposed to release thermal energy the first fluid energy machine receives thermal energy from the thermal energy storage and recovery device and the second fluid energy machine generates thermal energy for the thermal energy storage and recovery device, wherein the received thermal energy is larger than the generated thermal energy.

The described thermal energy storage and recovery system is based on the idea, that when the above described thermal energy storage and recovery device co-operates with two fluid energy machines in an appropriate manner a highly efficient temporal heat storage and heat recovery can be realized.

In this document the term "fluid energy machine" may be used for any thermodynamic arrangement, which is capable of exchanging mechanical work or mechanical energy with a working fluid. Here the working fluid may be the heat transfer medium which is guided through the container of the thermal energy storage and recovery device. Alternatively, the working fluid may be any other fluid, which is thermodynamically coupled, e.g. via a heat exchanger, with the heat transfer medium.

A fluid energy machine as defined above either (a) transfers mechanical work or mechanical energy from outside to the working fluid or (b) extracts mechanical work or mechanical energy from the working fluid and delivers this extracted mechanical work or energy to the outside (e.g. a rotating shaft of an electric generator).

In the first operational mode the first fluid energy machine may represent a gas compressor, wherein with the help of external mechanical energy the working fluid (e.g. the heat transfer medium) is compressed. In accordance with known thermodynamic principles the compression of the working fluid also causes an increase of the temperature of the working fluid. Further, in the first operational mode the second fluid energy machine may represent an expander, wherein some energy, which is still comprised in the cooled down heat transfer medium leaving the thermal energy storage and recovery device is used for generating some mechanical work. Again, the expander may be driven directly by the heat transfer medium or by another working fluid, which is thermodynamically coupled with the heat transfer medium leaving the thermal energy storage and recovery device e.g. by means of a heat exchanger.

It is mentioned that the working fluid respectively the heat transfer medium may carry different types of energy. In particular, the working fluid respectively the heat transfer medium may carry a mixture between thermal energy and mechanic energy, wherein the latter is stored in a compressible fluid when the fluid is under pressure. Further, also a kinetic energy may be associated with the working fluid (or the heat transfer medium) when the working fluid (or the heat transfer medium) flows with a certain velocity through corresponding guide channels.

In the second operational mode the first fluid energy machine may represent a gas turbine, wherein with the thermal energy and, if applicable, also with the mechanic energy stored in the heat transfer medium leaving the thermal energy storage and recovery device mechanical energy (e.g. in form of a rotating shaft) is generated. Further, in the second operational mode the second fluid energy machine may represent a compressor, wherein the (cold) heat transfer medium, which is fed to the thermal energy storage and recovery device, is compressed in order to be capable of extracting a higher amount of thermal energy from the thermal energy storage and recovery device when guided (under pressure) through the container.

The described thermal energy storage and recovery system may further provide the advantage that it is very easy to switch between the first operational mode and the second operational mode simply by reversing the flow direction of the heat transfer medium and, if applicable, also the flow direction of the working fluid.

According to an embodiment of the invention the thermal energy storage and recovery system further comprises a mechanical energy transmission arrangement, which is connected between the first fluid energy machine and the second fluid energy machine. Thereby, the mechanical energy transmission arrangement is configured for directly exchanging mechanical energy between the first fluid energy machine and the second fluid energy machine. This may provide the advantage that a highly efficient energy storage and recovery process may be realized because mechanical energy being generated at one of the two fluid energy machines can be directly transferred, i.e. without any (inefficient) energy conversion processes, to the other one of the two fluid energy machines.

Specifically, in the first operational mode after having fed hot compressed heat transfer fluid (e.g. air) via the first fluid terminal into the container a at least partially cooled down compressed heat transfer fluid may be returned at the second fluid terminal. Thereby, the energy and in particular the mechanical energy being left in the returned and cooled down compressed heat transfer fluid can be extracted with the second fluid energy machine acting as an expander and can be used to help driving the first fluid energy machine acting as a compressor for the heat transfer medium being compressed and then being fed to the container via the first fluid terminal.

Correspondingly, in the second operational mode the first fluid energy machine acting as a turbine is driven by heated up compressed heat transfer fluid (e.g. air), which is fed from the container via the first fluid terminal to the first fluid energy machine. Thereby, not all the mechanic energy being generated by the turbine is used for external purposes. Rather a portion of the generated mechanic energy is directly (i.e. without any inefficient energy conversion) transferred to the second fluid energy machine acting as a compressor. This transferred mechanical energy can then be used to help driving the compressor for the heat transfer medium which is supposed to be fed via the second fluid terminal to the container in order to be heated up before leaving the container via the first fluid terminal.

The mechanical energy transmission arrangement may be realized e.g. by means of a rotatable shaft, which connects the two fluid energy machines with each other.

According to a further embodiment of the invention the thermal energy storage and recovery system further comprises a cold storage device having a first fluid port for inserting heat transfer medium into the cold storage device and a second fluid port for extracting heat transfer medium from the cold storage device, wherein the first fluid port is connected with the second fluid energy machine and the second fluid port is connected with the first fluid energy machine. This may provide the advantage that a thermodynamic efficiency for temporarily storing thermal energy can take benefit not only from a high temperature within the thermal energy storage and recovery device but also from a low temperature within the cold storage device. In other words, the temperature difference between the thermal energy storage and recovery device and the cold storage device can be high such that in accordance with known thermodynamic principles the thermodynamic efficiency for a temporal heat storage and heat recovery can be maximized.

It is mentioned that also when using the described cold storage device it is very easy to switch between the first operational mode and the second operational mode. Again, this only requires to reverse the flow direction of the heat transfer medium and, if applicable, also the flow direction of the working fluid. Of course, in this case the first fluid port must also be configured for extracting heat transfer medium from the cold storage device and the second fluid port must also be configured for inserting heat transfer medium into the cold storage device.

According to a further aspect of the invention there is described a method for storing thermal energy within a thermal energy storage and recovery device of a thermal energy storage and recovery system as described above. The described method comprises (a) transferring a heat transfer fluid from the cold storage device to the first fluid energy machine, (b) compressing the transferred heat transfer fluid by the first fluid energy machine such that the heat transfer fluid is heated up, (c) transferring the compressed and heated up heat transfer fluid from the first fluid energy machine to the thermal energy storage and recovery device, (d) guiding the transferred compressed and heated up heat transfer fluid through the thermal energy storage and recovery device whereby thermal energy is transferred from the heat transfer fluid to the heat storage material such that the heat transfer fluid is cooled down, (e) transferring the cooled down heat transfer medium from the thermal energy storage and recovery device to the second fluid energy machine, (f) expanding the transferred cooled down heat transfer medium by the second fluid energy machine such that mechanical energy in generated and the heat transfer medium is further cooled down, and (g) transferring the expanded and further cooled down heat transfer medium from the second fluid energy machine to the cold storage device.

The described method for storing thermal energy is based on the idea that the above described thermal energy storage and recovery device can be used for a thermodynamic thermal energy storage process having an extraordinary high thermodynamic efficiency factor.

According to a further aspect of the invention there is described a method for recovering thermal energy from a thermal energy storage and recovery device of a thermal energy storage and recovery system as described above. The described method comprises (a) transferring a heat transfer fluid from the cold storage device to the second fluid energy machine, (b) compressing the transferred heat transfer fluid by the second fluid energy machine such that the heat transfer fluid is heated up, (c) transferring the compressed and heated up heat transfer fluid from the second fluid energy machine to the thermal energy storage and recovery device, (d) guiding the transferred compressed and heated up heat transfer fluid through the thermal energy storage and recovery device whereby thermal energy is transferred from the heat storage material to the heat transfer fluid such that the heat transfer fluid is further heated up, (e) transferring the further heated up heat transfer medium from the thermal energy storage and recovery device to the first fluid energy machine, (f) expanding the transferred further heated up heat transfer medium by the first fluid energy machine such that mechanical energy in generated and the heat transfer medium is cooled down, and (g) transferring the expanded and cooled down heat transfer medium from the first fluid energy machine to the cold storage device.

Also the described method for recovering thermal energy is based on the idea that the above described thermal energy storage and recovery device can be used for a thermodynamic thermal energy recovery process having an extraordinary high thermodynamic efficiency factor.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiments to be described hereinafter and are explained with reference to the examples of embodiments. Aspects of the invention will be described in more detail hereinafter with reference to examples of embodiments to which the invention is not limited.

DETAILED DESCRIPTION

The illustration in the drawing is schematically provided. It is noted that in different figures, similar or identical elements are provided with reference signs, which are different from the corresponding reference signs only within the first digit.

Figure 1:
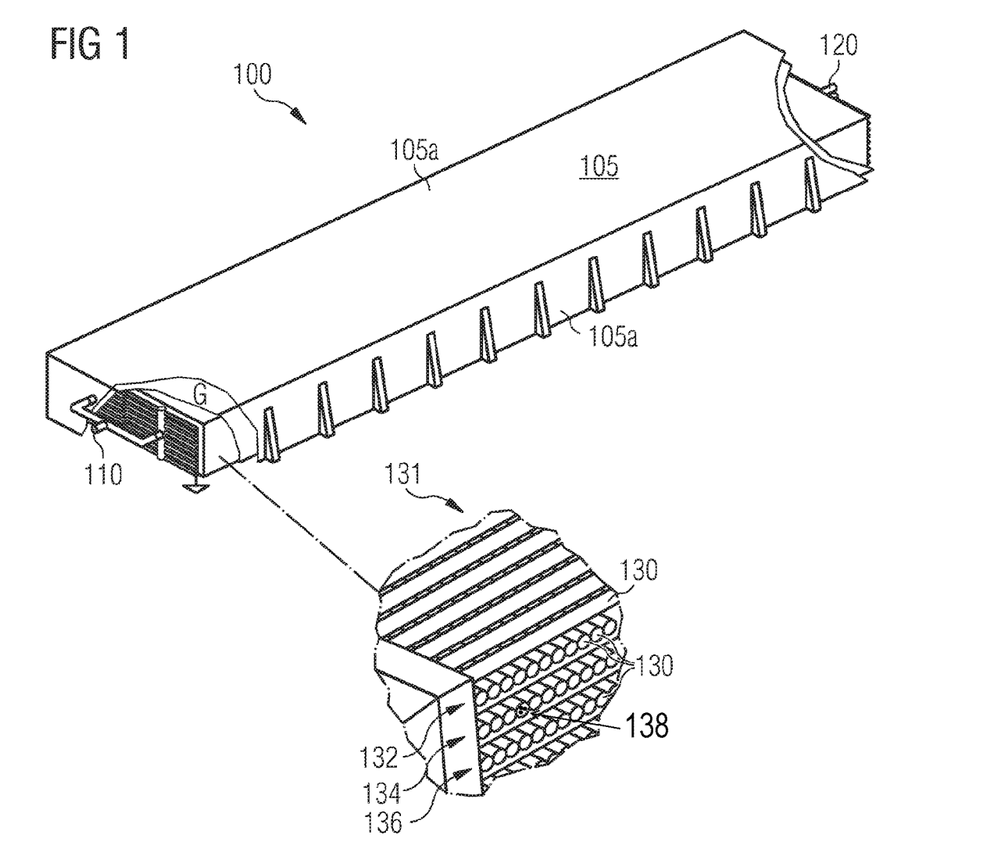
FIG. 1 shows in accordance with an embodiment of the invention an energy storage and recovery device.

FIG. 1 shows an energy storage and recovery device 100 for temporarily storing thermal energy. The energy storage and recovery device 100 comprises a container 105 having outer walls 105a. According to the embodiment described herein the outer walls are made from concrete. Further, the concrete walls 105a are insulated at the inside by a 0.5 to 2 meter thick layer of insulation material (not depicted). Preferably, the insulation material is able to withstand temperatures above 550° C.

The energy storage and recovery device 100 further comprises a first fluid terminal 110 and a second fluid terminal 120. Via one of the two fluid terminals 110, 120 a heat transfer medium such as a liquid or a gas can be supplied to the interior of the container 105. Via the other one of the two fluid terminals 110, 120 the heat transfer medium can be released from the container 105.

According to the embodiment described here the two fluid terminals 110, 120 are located at opposite sides of the container 105. This enables a long distance flow of heat transfer medium through the container 105 without requiring any internal walls.

Further, each fluid terminal is split into several sub-terminals in order to allow for any easy access of heat transfer medium into the container 105 and an easy egression of heat transfer medium from the container 105. The fluid terminals 110, 120 are preferably formed as feed inlets respectively feed outlets in order to reduce turbulences and/or an unwanted pressure drop as the heat transfer medium passes through the fluid terminals 110, 120.

As can be seen best from the enlarged insert of FIG. 1, within the container 105 there are provided a plurality of enclosures 130. According to the embodiment described here the enclosures are tube like or sock like structures 130 which are filled at least partially with a heat storage material 138. (The heat storage material 183 is only shown in a single structure 130 for clarity, but may be present in every structure 130.) In the described embodiment the tube like structures 130 are filled with sand which represents a widely available and cheap heat storage material.

Within the container 105 the tube like structures 130 are arranged in alternating layers whereby within each layer the tube like structures are oriented parallel with respect to each other and whereby the tube like structures 130 being assigned to neighboring layers are oriented perpendicular with respect to each other. In the enlarged insert of FIG. 1 an upper first layer 131, a neighboring second layer 132 as well as a fourth layer 134 and a sixth layer 136 both being arranged further down can be seen. Generally speaking, in every other layer the tube like structures 130 are placed in parallel with a main axis of the container, wherein the main axis represents the general flow direction of the heat transfer fluid within the container 105. The other layers have the tube like structures 130 oriented perpendicular to the flow direction and the tube like structures 130 are in close contact with each other in order to utilize the available storage space within the container 105.

According to the embodiment described herein the tube like structures within each uneven layer (e.g. layer 131) are positioned approximately 10 cm apart from each other thus enabling an easy flow of heat transfer medium (e.g. air) through the container 105. Of course, also other spatial patterns or distribution of the enclosures 130 are possible.

According to the embodiment described herein the enclosures 130 are made at least partially from a glass fiber material. This may provide the advantage that the fiber material provides a cheap and mechanically stable structure in order to keep the heat storage material (here sand) in place within the container 105. It might be advantageous to seal the glass fiber enclosures 130 in order to keep the heat storage material in place even if, e.g. after a plurality of extreme temperature cycles, the heat storage material has converted into a fine powder or a dust. A suitable sealing may be realized e.g. by means of a metal foil and/or tar.

It is mentioned that the first fluid terminal 110 serves as a heat transfer medium inlet for hot or heated up heat transfer medium during charging the thermal energy storage and recovery device 100 with thermal energy (first operational mode). During a discharging of the thermal energy storage and recovery device 100 from thermal energy (second operational mode) the first fluid terminal 110 serves as a heat transfer medium outlet for heated heat transfer medium.

Correspondingly, the second fluid terminal 120 serves as a heat transfer medium outlet for cooled down heat transfer medium during charging the thermal energy storage and recovery device 100 with thermal energy (first operational mode). During a discharging of the thermal energy storage and recovery device 100 from thermal energy (second operational mode) the second fluid terminal 120 serves as a heat transfer medium inlet for cold heat transfer medium which is supposed to be heated up.

Figure 2:
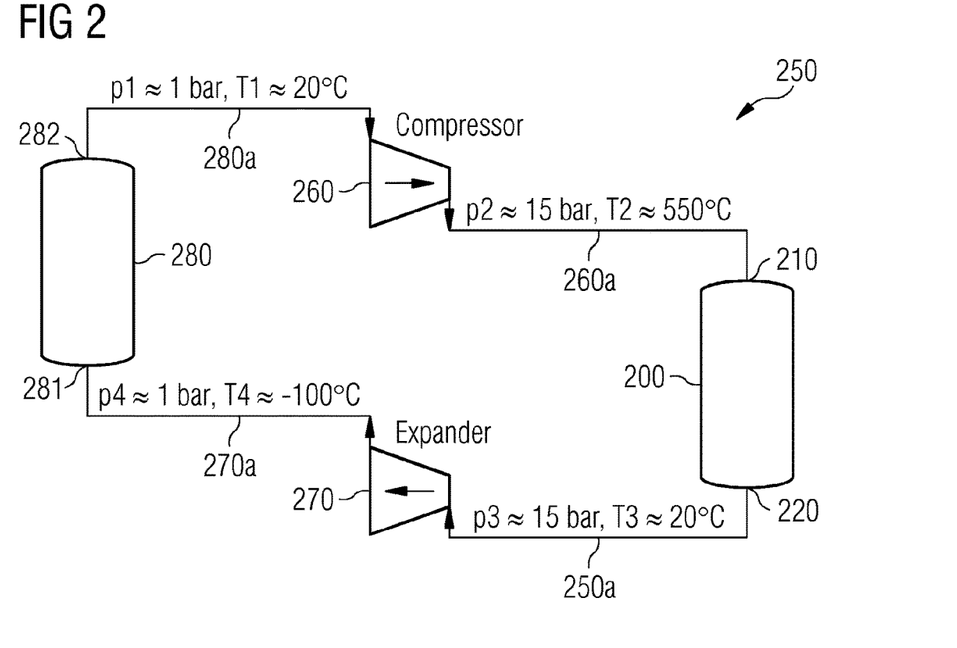
FIG. 2 shows in accordance with an embodiment of the invention an energy storage and recovery system in a first operational mode, wherein an energy storage and recovery device is charged with thermal energy.

FIG. 2 shows in accordance with an embodiment of the invention an energy storage and recovery system 250 in a first operational mode, wherein an energy storage and recovery device 200 as described above is charged with thermal energy. As can be seen from FIG. 2, apart from the energy storage and recovery device 200 the energy storage and recovery system 250 further comprises a cold source 280, a first fluid energy machine 260 and a second fluid energy machine 270. In the depicted first operational mode the first fluid energy machine acts like a compressor 260 and the second fluid energy machine acts like an expander 270.

The cold source 280 is connected via a second fluid port 282 of the cold source 280 and a fluid line 280a to the compressor 260. Further, the compressor 260 is connected via a fluid line 260a to a first fluid terminal 210 of the energy storage and recovery device 200. Furthermore, a second fluid terminal 220 of the energy storage and recovery device 200 is connected via a fluid line 250a to the expander 270 and the expander 270 is connected via a fluid line 270a to a first fluid port 281 of the cold source 280.

The fluid lines 280a, 260a, 250a and 270a as well as the other components of the thermal energy storage and recovery system 250 are designed in such a manner that they are able to withstand the respective temperature and the respective pressure of the heat transfer medium (here air) which is guided in a circular manner through the thermal energy storage and recovery system 250.

Specifically, according to the embodiment described herein (a) within the fluid line 280a the heat transfer medium has a pressure p1 of approximately 1 bar and a temperature T1 of approximately 20° C., (b) within the fluid line 260a the heat transfer medium has a pressure p2 of approximately 15 bar and a temperature T2 of approximately 550° C., (c) within the fluid line 250a the heat transfer medium has a pressure p3 of approximately 15 bar and a temperature T3 of approximately 20° C., and (d) within the fluid line 270a the heat transfer medium has a pressure p4 of approximately 1 bar and a temperature T4 of approximately −100° C.

At this point it is mentioned that it is possible however not essential that the cold source 280 is designed in the same or in a similar manner as the energy storage and recovery device 200.

In the following the thermodynamic cycle during the first operational mode of the thermal energy storage and recovery system 250 is described, wherein the thermal energy storage and recovery device 200 is charged with thermal energy. As can be seen from FIG. 2, heat transfer medium (here a gas such as air) leaves the cold source 280 and is transferred to the compressor 260. In the compressor 260 the gas is heated up (preferably by means of an adiabatic compression) to around 550° C. The gas is then guided to the thermal energy storage and recovery device 200 where heat from the gas is transferred to the heat storage material located inside the thermal energy storage and recovery device 200. As has already been mentioned above, the thermal energy storage and recovery device 200 comprises a plurality of enclosures which according to the embodiment described here are made of glass fiber. The enclosures, which are arranged inside the storage unit, maintain the heat storage material (here sand) and create a pathway for the gas in such a way that the gas can flow through the thermal energy storage and recovery device 200. At the same time the enclosures ensure a direct thermal heat transfer between the gas and the enclosures containing the sand.

After having transferred at least some of its thermal energy the still compressed gas is guided to the expander 270 where the gas is expanded. Thereby, e.g. by means of an adiabatic process, cold is produced. The cold from the expansion is then stored in the cold storage 280.

It is mentioned that the expander 270 and the compressor 260 are preferably connected to each other by a not depicted mechanical shaft. Thereby, a turboset arrangement can be realized and the overall efficiency of the whole thermal energy storage and recovery system 250 will be increased.

Figure 3:
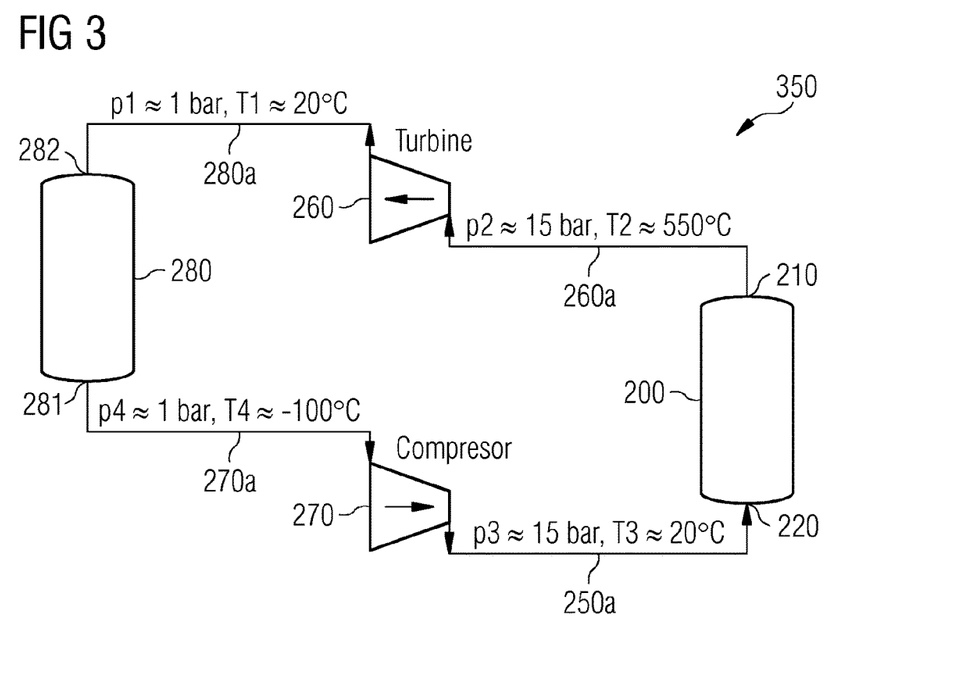
FIG. 3 shows the energy storage and recovery system depicted in FIG. 2 in a second operational mode, wherein the energy storage and recovery device is discharged from thermal energy.

FIG. 3 shows the energy storage and recovery system 250 depicted in FIG. 2, which is now denominated with reference numeral 350, in a second operational mode, wherein the energy storage and recovery device 200 is discharged.

Compared to the first operational state depicted in FIG. 2 the flow direction through the system 250 is reversed. Further, now the first fluid energy machine 260 acts as a turbine and the second fluid energy machine 270 acts as a compressor.

Energy is recovered by using the cold stored in the cold storage 280 where gas at ambient temperature T1 of about 20° C. is guided through the cold storage in such a way that the gas leaves the cold storage at T4≈−100° C. The cooled gas is then compressed to around 15 bar by a compressor 270 and is heated up to a positive temperature T3 of about 20° C. The compressed and heated up gas is then guided through the thermal energy storage and recovery device 200 where it is heated up. The gas leaves the thermal energy storage and recovery device 200 at a temperature T2 of around 550° C. The hot gas at high pressure is then utilized in the turbine 260 connected to a not depicted generator in order to generate electricity.

It is mentioned that the thermal energy storage and recovery system described in this document can be realized also with one or more heat exchangers and/or with a steam discharge cycle.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A thermal energy storage and recovery device comprising:
    a container having a first fluid terminal for inserting a heat transfer medium into an interior of the container and a second fluid terminal for extracting the heat transfer medium from the interior of the container,
    a heat storage material (a) for receiving thermal energy from the heat transfer medium when the thermal energy storage and recovery device is in a first operational mode and (b) for releasing thermal energy to the heat transfer medium when the thermal energy storage and recovery device is in a second operational mode, and
    a plurality of enclosures, each disposed within the container and each filled at least partially with a part of the heat storage material, wherein the enclosures are spatially arranged within the container in such a manner that
    (i) a flow of the heat transfer medium is guidable between the first fluid terminal and the second fluid terminal and
    (ii) a direct thermal contact between the heat transfer medium and the plurality of enclosures is achievable as the heat transfer medium flows between the first fluid terminal and the second fluid terminal,
    wherein the plurality of enclosures comprises layers of tube-like structures,
    wherein the tube-like structures within a layer comprise longitudinal axes that are parallel to each other, and
    wherein longitudinal axes of the tube-like structures in a first layer are not parallel to longitudinal axes of the tube-like structures in adjacent layers,
    wherein the longitudinal axes of the tube-like structures in the first layer are oriented parallel to a direction of flow of the heat transfer medium through the container,
    wherein the tube-like structures in the first layer are spaced apart, and
    wherein the tube-like structures in the adjacent layers are more closely packed together than the tube-like structures in the first layer.

2. The thermal energy storage and recovery device as set forth in claim 1, wherein
    the enclosures are made at least partially from a fiber material.

3. The thermal energy storage and recovery device as set forth in claim 1, wherein within the container the tube like structures are arranged in alternating layers.

4. The thermal energy storage and recovery device as set forth in claim 1, wherein
    the heat storage material being accommodated within the enclosures is at least partially sand.

5. The thermal energy storage and recovery device as set forth in claim 1, wherein
    an outer wall of the container is made at least partially from concrete.

6. The thermal energy storage and recovery device as set forth in claim 5, wherein
    the outer wall is insulated with an insulation layer comprising an insulation material that is able to withstand temperatures above 550° Celsius.

7. A thermal energy storage and recovery system comprising:
    a thermal energy storage and recovery device as set forth in claim 1, further comprising
    a first fluid energy machine being connected with the first fluid terminal, and
    a second fluid energy machine being connected with the second fluid terminal, wherein
    the first fluid energy machine and the second fluid energy machine are configured such that
    (a) in a first operational mode in which the thermal energy storage and recovery device receives thermal energy, the first fluid energy machine generates thermal energy for the thermal energy storage and recovery device and the second fluid energy machine receives thermal energy from the thermal energy storage and recovery device, wherein the generated thermal energy is larger than the received thermal energy, and
    (b) in a second operational mode in which the thermal energy storage and recovery device releases thermal energy,
    the first fluid energy machine receives thermal energy from the thermal energy storage and recovery device and
    the second fluid energy machine generates thermal energy for the thermal energy storage and recovery device, wherein the received thermal energy is larger than the generated thermal energy.

8. The thermal energy storage and recovery system as set forth in claim 7, further comprising:
    a mechanical energy transmission arrangement, which is connected between the first fluid energy machine and the second fluid energy machine, wherein the mechanical energy transmission arrangement is configured for directly exchanging mechanical energy between the first fluid energy machine and the second fluid energy machine.

9. The thermal energy storage and recovery system as set forth in claim 7, further comprising:
    a cold storage device having a first fluid port for inserting heat transfer medium into the cold storage device and a second fluid port for extracting heat transfer medium from the cold storage device, wherein the first fluid port is connected with the second fluid energy machine and the second fluid port is connected with the first fluid energy machine.

10. A method for storing thermal energy within a thermal energy storage and recovery device of a thermal energy storage and recovery system as set forth in claim 9, the method comprising:
- transferring a heat transfer fluid from the cold storage device to the first fluid energy machine,
- compressing the transferred heat transfer fluid by the first fluid energy machine such that the heat transfer fluid is heated up,
- transferring the compressed and heated up heat transfer fluid from the first fluid energy machine to the thermal energy storage and recovery device,
- guiding the transferred compressed and heated up heat transfer fluid through the thermal energy storage and recovery device whereby thermal energy is transferred from the heat transfer fluid to the heat storage material such that the heat transfer fluid is cooled down,
- transferring the cooled down heat transfer medium from the thermal energy storage and recovery device to the second fluid energy machine,
- expanding the transferred cooled down heat transfer medium by the second fluid energy machine such that mechanical energy in generated and the heat transfer medium is further cooled down, and
- transferring the expanded and further cooled down heat transfer medium from the second fluid energy machine to the cold storage device.

11. A method for recovering thermal energy from a thermal energy storage and recovery device of a thermal energy storage and recovery system as set forth in claim 9, the method comprising:
- transferring a heat transfer fluid from the cold storage device to the second fluid energy machine,
- compressing the transferred heat transfer fluid by the second fluid energy machine such that the heat transfer fluid is heated up,
- transferring the compressed and heated up heat transfer fluid from the second fluid energy machine to the thermal energy storage and recovery device,
- guiding the transferred compressed and heated up heat transfer fluid through the thermal energy storage and recovery device whereby thermal energy is transferred from the heat storage material to the heat transfer fluid such that the heat transfer fluid is further heated up,
- transferring the further heated up heat transfer medium from the thermal energy storage and recovery device to the first fluid energy machine,
- expanding the transferred further heated up heat transfer medium by the first fluid energy machine such that mechanical energy in generated and the heat transfer medium is cooled down, and
- transferring the expanded and cooled down heat transfer medium from the first fluid energy machine to the cold storage device.

12. The thermal energy storage and recovery device as set forth in claim 1, wherein
the enclosures are made from a glass fiber material and/or from a basalt fiber material.

13. The thermal energy storage and recovery device as set forth in claim 1, wherein the tube-like structures in the adjacent layers abut each other.

* * * * *